US012676425B2

(12) United States Patent
Hofman

(10) Patent No.: US 12,676,425 B2
(45) Date of Patent: Jul. 7, 2026

(54) RF-CAMERA WITH TWO-DIMENSIONAL RADIO FREQUENCY PICKUP SENSOR

(71) Applicant: Hofman Arts (Harts) LTD, Timrat (IL)

(72) Inventor: Ofer Hofman, Timrat (IL)

(73) Assignee: Hofman Arts (Harts) LTD, Timrat (IL)

( * ) Notice: Subject to any disclaimer, the term of this patent is extended or adjusted under 35 U.S.C. 154(b) by 261 days.

(21) Appl. No.: 18/484,557

(22) Filed: Oct. 11, 2023

(65) Prior Publication Data

US 2024/0128656 A1 Apr. 18, 2024

Related U.S. Application Data

(60) Provisional application No. 63/415,313, filed on Oct. 12, 2022.

(51) Int. Cl.
*H01Q 15/02* (2006.01)
*H01Q 21/06* (2006.01)

(52) U.S. Cl.
CPC .......... *H01Q 21/062* (2013.01); *H01Q 15/02* (2013.01)

(58) Field of Classification Search
CPC .... H01Q 15/02; H01Q 19/062; H01Q 21/062; H01Q 25/007
See application file for complete search history.

(56) References Cited

U.S. PATENT DOCUMENTS

2021/0135373 A1* 5/2021 Spielmann ............ H01Q 13/10

FOREIGN PATENT DOCUMENTS

CN 108259648 A * 7/2018 ........... H04M 1/026

OTHER PUBLICATIONS

CN 108259648 translation (Year: 2018).*

* cited by examiner

*Primary Examiner* — Timothy A Brainard
(74) *Attorney, Agent, or Firm* — Manelli Selter PLLC; Edward Stemberger

(57) ABSTRACT

The embodiment relates to the field of capturing a picture of the field of view with the same principles as a visual light camera, but with RF signals. This RF-camera uses an RF signal lens that concentrates the RF signal returned from the field of view on to a 2D array of antennas. The RF lens is achieved by a mirror lens rather than a glass lens used in visual light cameras. Mirroring RF signal is simple and mimic optical mirrors. The 2D array can be achieved by building an array of RF antennas on a silicon (or similar) chip. These antennas become smaller as the frequency increases.

9 Claims, 9 Drawing Sheets

RF-CAMERA WITH TWO-DIMENSIONAL RADIO FREQUENCY PICKUP SENSOR

This application claims the benefit of priority from U.S. provisional application No. 63/415,313, filed on Oct. 12, 2022, the content of which is hereby incorporated by reference into this specification.

TECHNOLOGY FIELD

The present device and method relate to the field of surveying and detecting an image using radio frequency electromagnetic waves.

BACKGROUND

Traditional RF RADARs continuously send a pencil sharp train of RF pulses which scan the field of view to build the 3D image. Each transmitted pulse produces a pixel of the final image throughout the depth of field for that pixel. Traditional RF RADAR lacks the use of lens. The proposed RF Camera uses lens just like light camera and produces a 2D and even 3D image with a single RF transmitted pulse, very much like light camera that captures a 2D image with lens and a single flash of light.

The proposed RF-Camera uses more than 10000 times less energy than the equivalent RADAR thanks to the use of lens. The proposed RF-Camera uses a transmitter that sends a single pulse (flash) of energy to the entire field of view, compared with a RADAR transmitting 10's to 100's of pulses of high energy, pencil sharp beam, at each pixel in the field of view. The proposed RF-Camera performs its SNR enhancement on the returned signal by using a concentrator lens.

DETAILED DESCRIPTION OF EXAMPLE EMBODIMENTS

Figure 1:
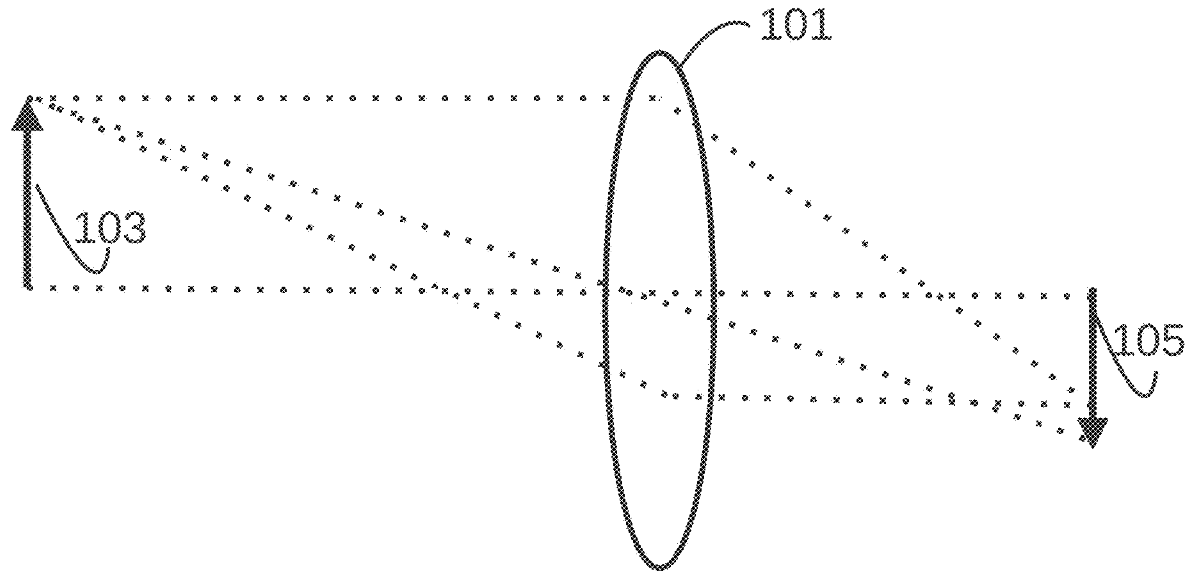
FIG. 1 is an example of an optical lens.

FIG. 1 is an example of an optical lens (101). A regular light camera uses a lens to concentrate the light emitted by pixel objects on to a pixel in the 2D pickup array of the image sensor. The lens (101) bends the conus of light emitted by an object (103) being photographed to a pixel in the 2D array of pixels at a pickup sensor (105). The lens (101) concentrates the energy of the conus of light emitted by a pixel object to a single pixel on the sensor. Camera Obscura cameras do not have lens, but rather a hole through which the light from the object passes through and continues straight to the sensor. The lack of lens produces a low brightness image. Existing planner array RADARs operate without lens, and thus pick up a very low power RF signal, which require them to transmit a very energetic RF pulse. The presented RF-Camera enjoys the benefit of lens to reduce the transmitted RF dramatically.

Existing RADARs operate without lens, very much like Camera Obscura. In Camera Obscura, the area of the hole determines the pixel size. When using lens, the lens focusses the energy onto each pixel, and thus the area of the lens determines the amount of energy captured by each pixel. For example, if the lens area is the same as the 2D pickup array, the energy amplification of lens is thus the ratio between the pixel area and the lens area. Example: Assume a 2D array of 20×20 pixels. The amplification is thus 400. A 2D array of 200×200 pixels would amplify the signal by 40,000.

Figure 2A:
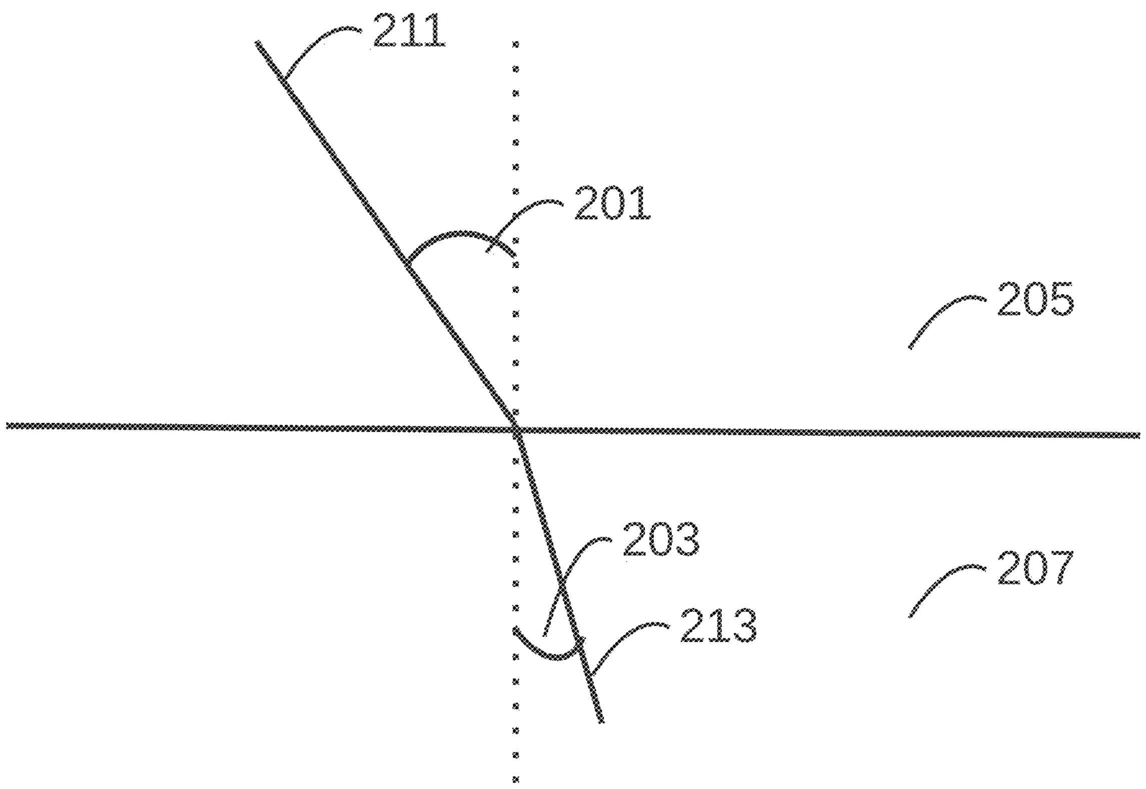
FIG. 2A is a description of light reflection at an interface also known as Snell's law.

FIG. 2A is a description of light reflection at an interface also known as Snell's law. A light ray (211) traversing a first material (205) with refractive index n1 enters a second material (207) at angle a (201) with refractive index n2 and is transmitted at an angle (203) given by n1/n2*sin(a). The lens is built on the principle of a curved mirror and looks like a satellite dish and assumes that RF signal is reflected from metal as light is.

Figure 2B:
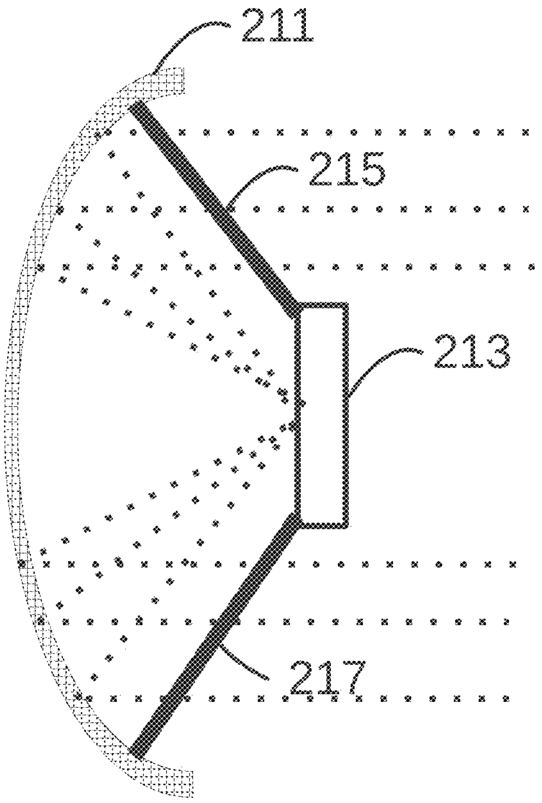
FIG. 2B is a description of parabolic reflector and 2D antenna array.

FIG. 2B is a description of parabolic reflector (211), 2D antenna array (213), and one or more support structures (215, 217) connecting the parabolic reflector (211) and 2D antenna array (213). In traditional RADARs, there are no lens. However, parabolic reflector (211) is used to concentrate the RF signal returned from the field of view to the pickup element located at the focal point of the parabolic deflector (211).

In traditional RADARs, there are no lens. However, parabolic reflector dish is used to concentrate the RF signal returned from the field of view to the pickup element located at the focal point of this dish. Some visual light telescopes use curved mirrors instead of lens. These mirrors are not transparent as glass lens are, but their effect is similar, and is achieved by reflection. For the RF-Camera we use similar curved mirrors made of metal that mirror the RF signals like those mirror lens and produces the same effect as glass lens. If the 2D pickup sensor size is 5 cm×5 cm, the exposed lens area should also be 25 cm square.

The cone of RF is blocked by the 2D image sensor because the lens are mirror lens. So, if the mirror lens width and height is 5×1.41, the area of the lens would be 50 cm square. Thus, a dish size of 7 cm by 7 cm (or more) would support an amplification factor of 10,000 for 307 GHz RF array of 100×100 antennas. The distance between the 2D sensor and the mirror lens should mimic those of light wave camera.

A transmitter transmits a pulse of RF signal aimed at the entire field of view (rather than a pencil sharp signal as in RADARs). This mimics a visible light flash. The RF advances through the 3D space and is reflected from objects over time and depend on the reflection ratio of each object. Metal objects reflect more than other materials. The reflected signals are emitted to all directions, and some are emitted towards the RF-camera lens. The lens mimics a satellite (RF) reception dish which concentrate the signal to the focal point. A 2D array of antennas are placed in the focal point (instead of the traditional antenna). Each pixel on the 2D array is a small dipole antenna and picks up the reflected and concentrated energy from the lens. Each of the pixels pick up a particular pixel object in the field of view. Each pixel in the antenna array is an RF-Antenna. For example, a standard dipole antenna. The array of dipoles for low frequency RF signal might be very big in size. Latest technologies can produce a dipole antenna on a silicon chip. For higher RF frequencies, the dipole size is reduced with the lower wavelength. A 77-Ghz signal can be picked up with this silicon size of −4 mm square. An array of 60 by 60 such antennas would require 12 cm×12 cm on silicon, or PCB (D. Neculoiu, A. Muller, K. Tang, E. Laskin and S. P. Voinigescu, “160 GHz On-Chip Dipole Antenna Structure in Silicon Technology,” 2007 International Semiconductor Conference, Sinaia, Romania, 2007, pp. 245-248, doi: 10.1109/SMICND.2007.4519692.). For 77 Ghz, ½ wavelength is 1.9 mm, still this antenna is 1 mm. If the Dipole Antenna is less than ½ wavelength the output impedance is reduced, but it is still large enough to be viable.

The pixel length and width of the pickup dipole antenna is assumed in the previous example to be 2 mm for 77 Ghz. For 154 Ghz it would be 1 mm. For 308 Ghz it would be ½ mm. A 2D Array of such antennas in silicon can thus yield a 20×20 array in 1 cm on 1 cm image sensor. Similarly, an image sensor of 5 cm×5 cm can yield an array of 100×100 pixels.

Figure 3:
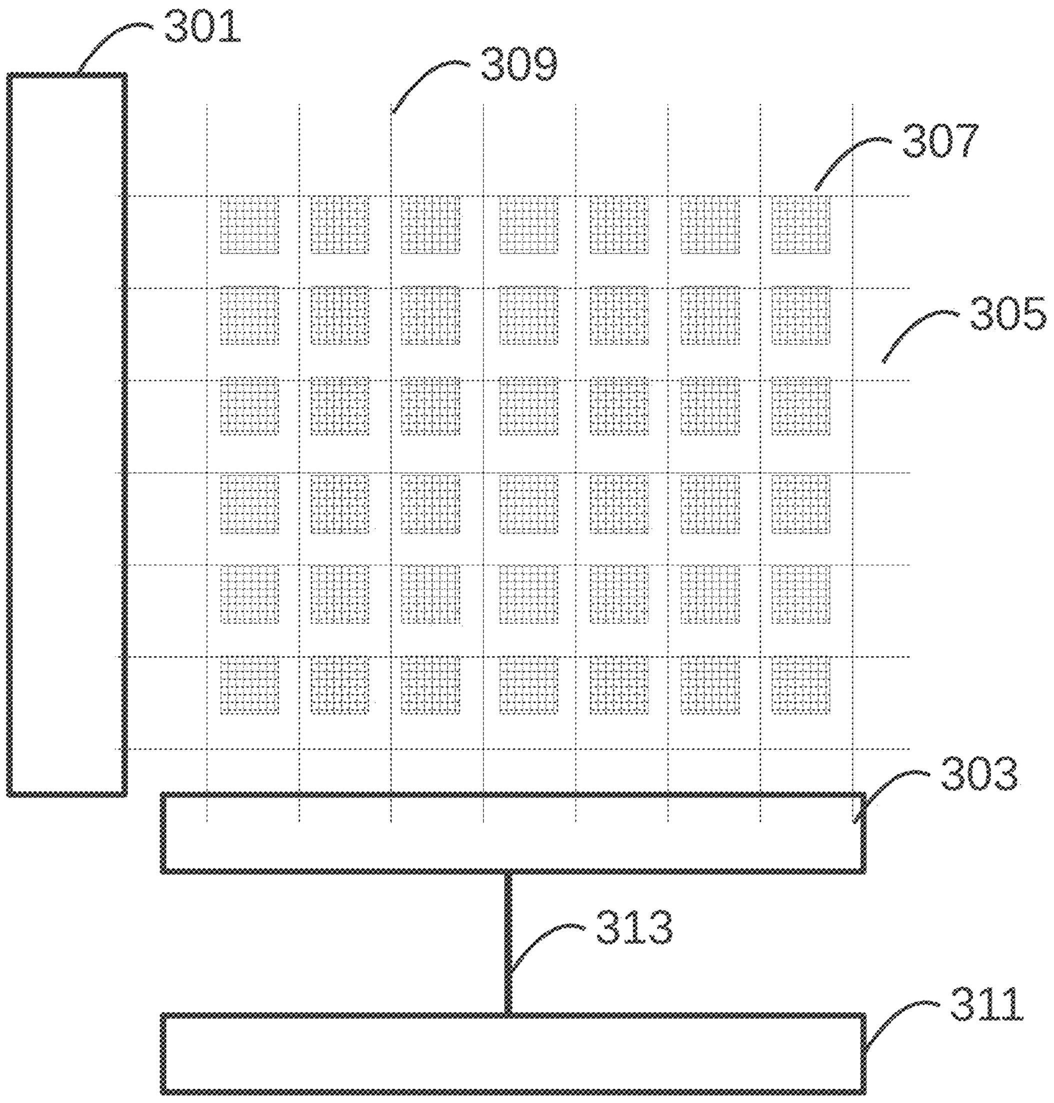
FIG. 3 is a description of a readout method of a 2D antenna array.

FIG. 3 is a description of a readout method of a 2D antenna array. A 2D antenna array includes a plurality of pixels (307) where each pixel is electrically connected horizontally (305) and vertically (309) to a horizontal mux (301) and vertical mux (303) respectively. The output of each mux transmits the readout information through a data bus (313) to an output buffer (311).

Figure 4:
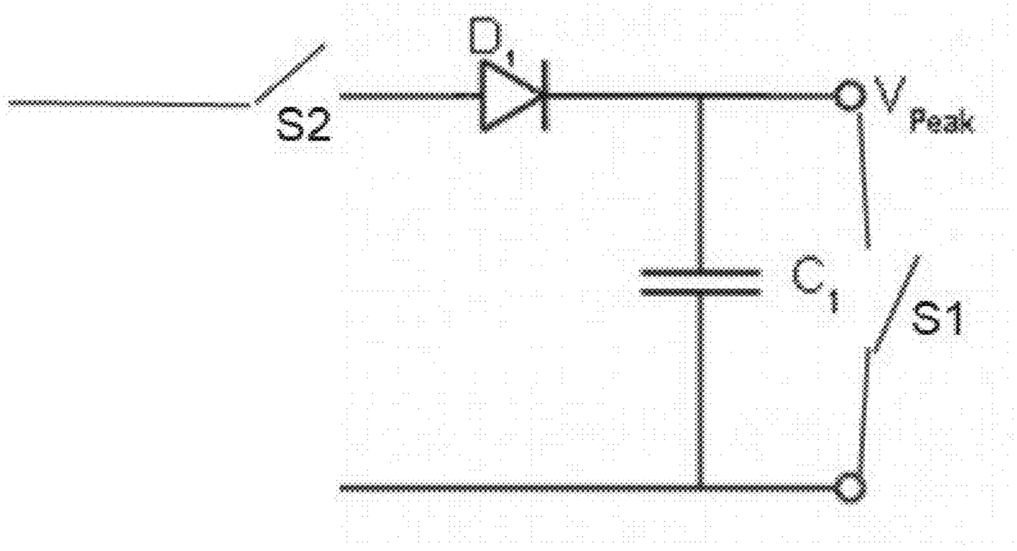
FIG. 4 describes the antenna pickup circuit.

FIG. 4 is an example of an antenna pickup circuit. The antenna pickup circuit can be a standard peak detector. Composed of an RF diode and capacitor. The energy is accumulated in the capacitor for as long as there is energy detected in the dipole antenna. The capacitor can be discharged by a (FET) switch S1. The switch shorts and discharges the capacitor to clear it for a later shot, or a later time slot. Another switch can be in series to the diode S2. When the switch is close it will allow the diode to charge the capacitor, otherwise, would prevent additional energy and hold the capacitor voltage. S2 is like a shutter in light camera.

The transmitting antenna has to transmit a signal in the desired frequency. The transmitting antenna can be separate from the pickup sensor, thus the sensor itself does not have to be built for transmission, but rather for reception only, thus making it very low power and size. The transmitting antenna can be located back-to-back of the 2D sensor and point to the field of view, but can be located aside of the lens, or any location to emit energy to the field of view. For Stereo image, a transmitting antenna can be in the middle between two pickup RF-antennas. The transmitter should operate like a camera flash and should emit energy to the field of view. The amount of energy transmitted should assume the decay over distance, but also assume the amplification factor added by the lens. An instant single flash of energy lights up the entire field of view which reflect that energy back to the RF-Camera based on the material RF reflectance.

Figure 5A:
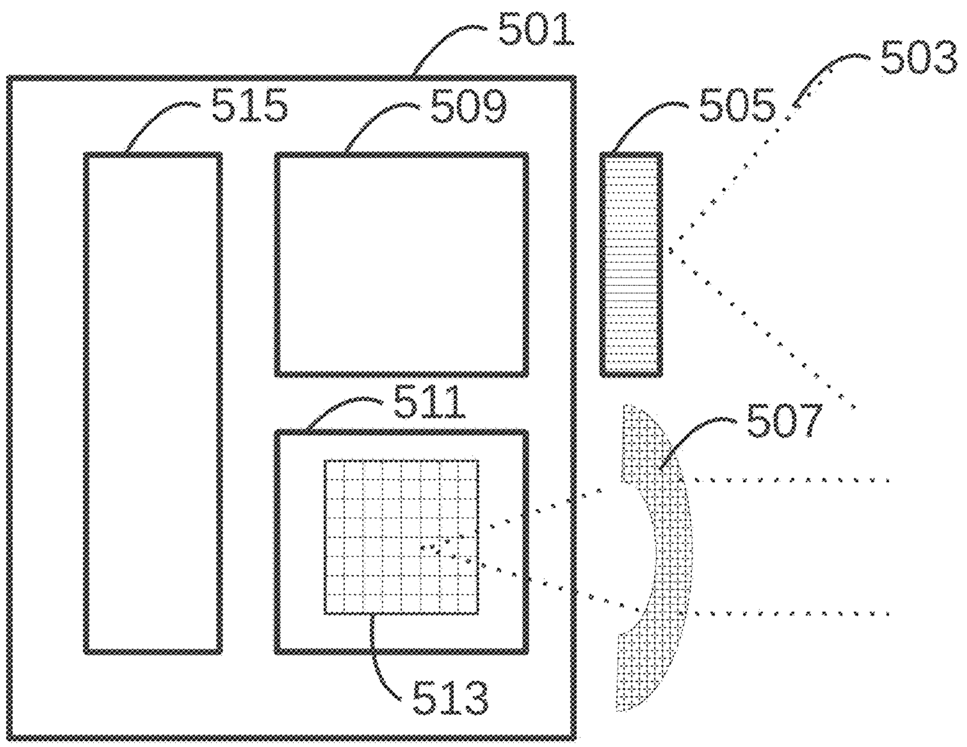
FIG. 5A is an example of a RF camera which includes a RF transmitter.

FIG. 5A is an example of a RF camera (501) which includes a RF transmitter (509) configured to transmit at least one RF signal through a RF antenna (505) to generate a RF beam (503); a RF detector (511) comprising an array of RF receivers (513) and readout circuit wherein a RF lens (507) focuses RF signals on the RF receivers. The RF camera is controlled by a processor circuit (515). Processor circuit (515) functions include any of but are not limited to; operation of RF transmitter (509); operation of RF detector (511); operation of RF receiver array (513) and related readout circuit; signal processing functions relating to electrical signal from readout circuit; reconstructing image from readout circuit electrical signals.

Figure 5B:
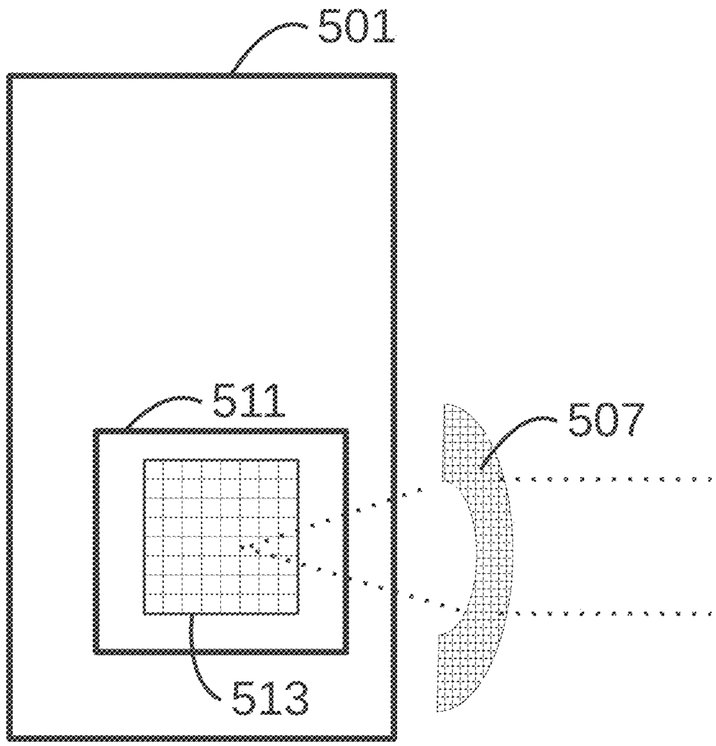
FIG. 5B is an example of a RF camera configured to operate on RF background reflections without a RF transmitter.

FIG. 5B is an example of a RF camera (501) configured to operate on RF background reflections without a RF transmitter (FIG. 5A, 509). In this example RF camera includes a RF detector (511) comprising an array of RF receivers (513) and readout circuit wherein a RF lens (507) focuses RF signals on the RF receivers. The RF camera is controlled by a processor circuit (515) (see FIG. 5A). Processor circuit (515) functions include any of but are not limited to operation of RF transmitter (509); operation of RF detector (511); operation of RF receiver array (513) and related readout circuit; signal processing functions relating to electrical signal from readout circuit; reconstructing image from readout circuit electrical signals.

Figure 6:
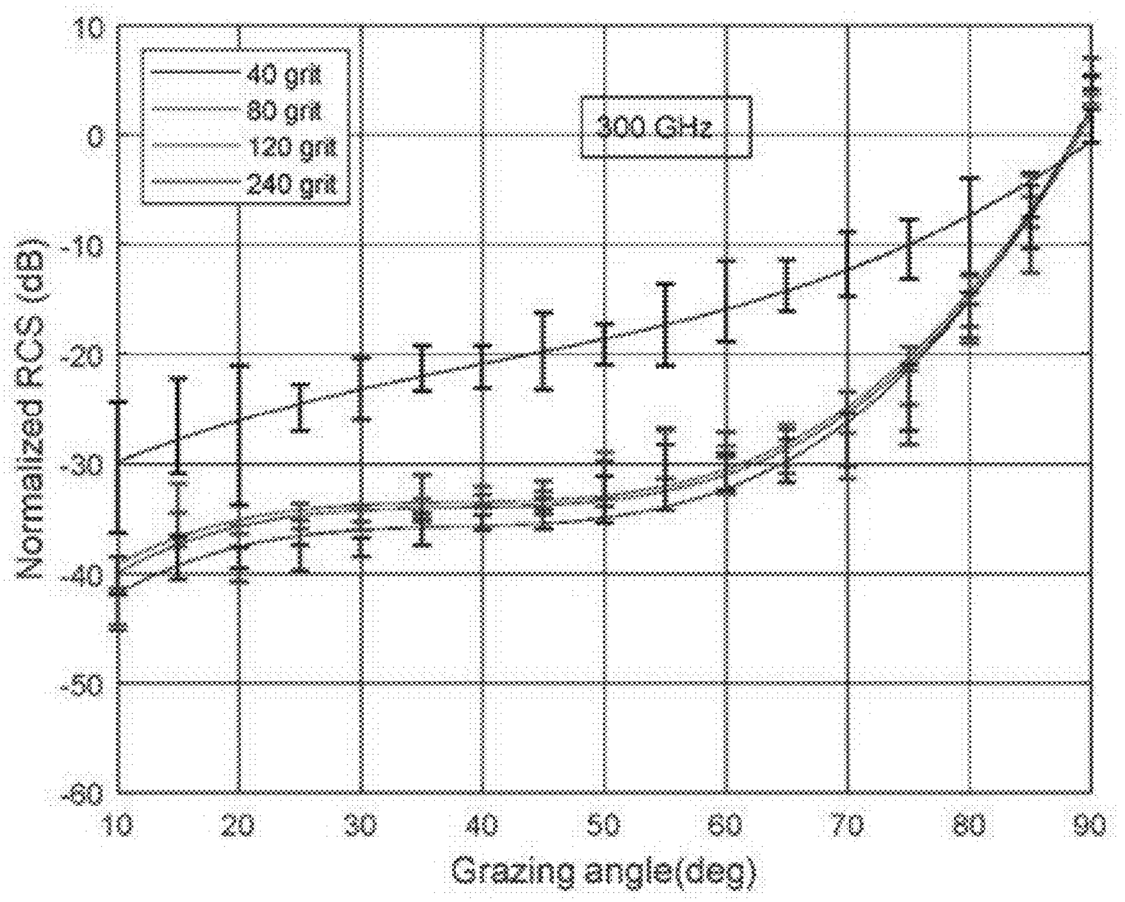
FIG. 6 is a graph showing the radar cross sections for different targets and grazing angles.
Figure 7:
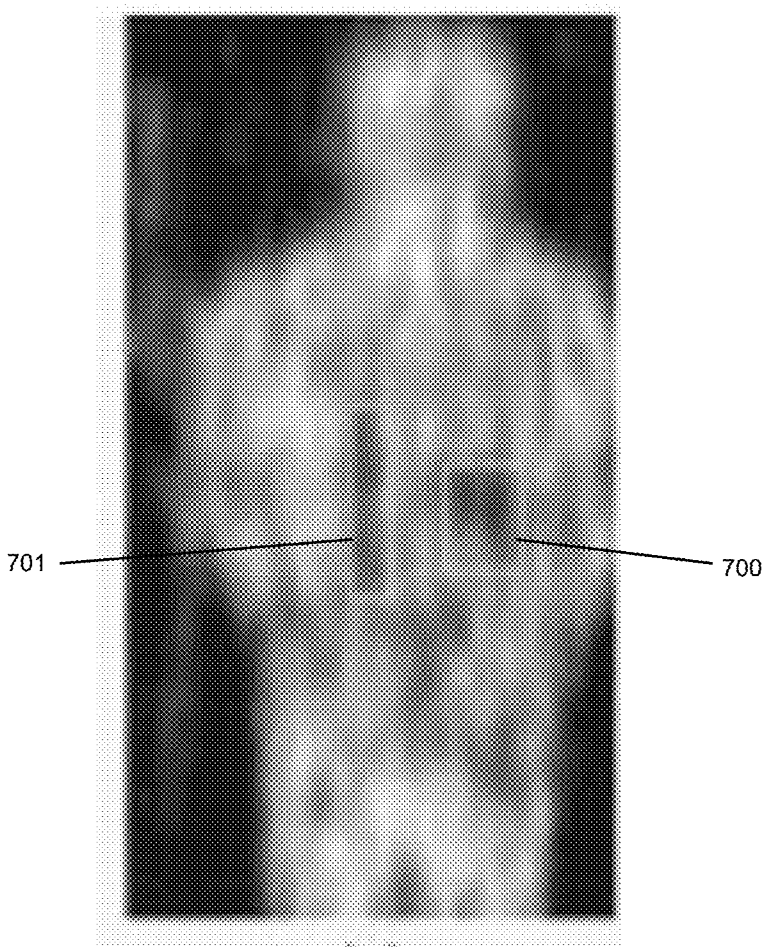
FIG. 7 is an example of an application of the RF camera to detect concealed weapons.

FIG. 6 is a graph showing the radar cross sections for different targets and grazing angles; and FIG. 7 is an example of an application of the RF camera to detect concealed weapons (700, 701) on a human. Additional examples include but are not limited to; drone detection; mine detection; detection of movement through obstacles such as walls; luggage inspection; human movement detection; synthetic image creation; autonomous driving support; navigation and location support.

To sum, we describe a system for capturing an image comprised of; at least one RF transmitter; an array of RF detectors; a readout circuit and a processor configured to operate at least one RF transmitter to transmit an RF signal, receive the detected signal from the readout circuit and reconstruct an image corresponding to the RF signal detected by the array of RF detectors. In a further example the RF frequency range is any of 100 to 300 GHz; 200 to 400 GHz; 300 to 500 GHz; 400 to 600 GHz. In a further example the system for capturing an image includes a RF lens located prior to the array of RF detectors, wherein the RF lens focuses the RF radiation to each individual detector of the RF detector array. In an alternative example a system for capturing an image comprising of; an array of RF detectors; a readout circuit and a processor configured to operate at least one RF transmitter to transmit an RF signal, receive the detected signal from the readout circuit and reconstruct an image corresponding to the RF signal detected by the array of RF detectors. In a further example the RF frequency range is any of 100 to 300 GHz; 200 to 400 GHz; 300 to 500 GHz; 400 to 600 GHz. In a further example the system for capturing an image further includes a RF lens located prior to the array of RF detectors, wherein the RF lens focuses the RF radiation to each individual detector of the RF detector array.

An advantage of the RF frequency compared with light is that RF penetrates certain materials that light does not. For example, biological tissues. This allows RF-Camera to see into human bodies. Once the flash pulse is transmitted, the signal travels in the speed of light to the field of view and is reflected from bodies back towards the RF-Camera. Far away bodies' return signal would return to the RF-Camera, later than close bodies. If the shutter is opened for reception for a short period at a particular delay since the transmission, the reception would represent the bodies at a particular distance from the RF-Camera. In this way, the RF-Camera, with the proper transmit and receive synchronization can produce 3D images. Modern radars slice their reception time slices that follow the transmitted pulse. These are called range gates. The receiver has two detectors that ping pong between them. When one is integrating, the other is read and cleared, and for the next range gate, they swap their role.

This technology can be implemented for each antenna pixel in the 2D array. In full deployment of above, the RF-Camera can produce a 3D image with a single transmitted pulse.

What is claimed is:

1. A system for capturing an image comprising:

at least one RF transmitter configured to transmit at least one RF signal;

an array of RF detectors;

a metal parabolic reflector located prior to the array of RF detectors, wherein the parabolic reflector is configured to focus reflected RF radiation to the array of RF detectors, and a readout circuit and a processor circuit configured to operate the at least one RF transmitter to transmit the RF signal, receive a detected RE signal from the readout circuit and reconstruct an image corresponding to the RF signal detected by the array of RF detectors.

2. The system for capturing an image of claim 1, wherein the array of RF detectors is configured to detect a RF frequency range of any of 100 to 300 GHz; 200 to 400 GHz; 300 to 500 GHz; 400 to 600 GHz.

3. The system for capturing an image of claim 1, wherein the parabolic reflector is configured to the focus RF radiation to each individual detector of the RF detector array.

4. A system for capturing an image comprising:

an array of RF detectors;

a metal parabolic reflector located prior to the array of RF detectors, wherein the parabolic reflector is configured to focus reflected RF radiation to the array of RF detectors, and a readout circuit and a processor circuit configured to operate at least one RF transmitter to transmit an RF signal, receive a detected signal from the readout circuit and reconstruct an image corresponding to the RF signal detected by the array of RF detectors.

5. The system for capturing an image of claim 4, wherein the array of RF detectors is configured to detect a the RF frequency range of any of 100 to 300 GHz; 200 to 400 GHz; 300 to 500 GHz; 400 to 600 GHz.

6. The system for capturing an image of claim 4, wherein the parabolic reflector is configured to the focus RF radiation to each individual detector of the RF detector array.

7. A method of capturing an image comprising:

transmitting, via a transmitter, a pulse of RF signal aimed at an entire field of view so as to reflect from objects over time; and receiving some of the reflected signals at a metal parabolic reflector that concentrates the signals to a focal point, at which a 2D array of antennas are placed, with each pixel on the 2D array of antennas picking up reflected and concentrated energy from the parabolic reflector.

8. The method of claim 7, wherein each of the pixels pick up a particular pixel object in the field of view.

9. The method of claim 8, wherein each pixel in the antenna array is an RF-Antenna.

* * * * *